March 26, 1957 C. W. JOHNSON Re. 24,295

STOCK WATER HEATER

Original Filed June 18, 1952 3 Sheets-Sheet 1

INVENTOR.
Charles W. Johnson
BY Eugene A. Simpson
Attorney

STOCK WATER HEATER

Original Filed June 18, 1952 3 Sheets-Sheet 2

INVENTOR.
Charles W. Johnson
BY Eugene L. Simpson
Attorney

STOCK WATER HEATER

Original Filed June 18, 1952 3 Sheets-Sheet 3

INVENTOR.
Charles W. Johnson
BY
Eugene K. Simpson
Attorney

United States Patent Office

Re. 24,295
Reissued Mar. 26, 1957

24,295

STOCK WATER HEATER

Charles W. Johnson, Cedar Rapids, Iowa, assignor to Johnson Gas Appliance Co., Cedar Rapids, Iowa, a corporation of Iowa Original No. 2,696,815, dated December 14, 1954, Serial No. 294,165, June 18, 1952. Application for reissue March 19, 1956, Serial No. 572,607

29 Claims. (Cl. 126—360)

Matter enclosed in heavy brackets [ ] appears in the original patent but forms no part of this reissue specification; matter printed in italics indicates the additions made by reissue.

This invention relates to a stock water heater adapted to retain water in a watering tank at suitable temperature for stock to drink.

Stock water tanks are located at points in the open pasture which are convenient for the cattle to reach. They are subject to very low atmospheric temperatures during winter months at which time the water may freeze over unless a special heater is provided. The present stock water heater is adapted to be immersed in the water of such a stock watering tank to maintain the water at a suitable drinking temperature for the cattle, and to prevent any possibility of freezing.

In stock water heaters, operated by gas burners, which are intended to be immersed in tanks, as contrasted with stock water heaters projecting through apertures in the sides of the tanks, it is necessary in order to maintain continuous operation, to provide a constant and sufficient supply of air to support combustion and to dispose of burnt gases that might collect in the bottom of the heaters. Also, means must be provided either to prevent the formation of or to dispose of any condensate that might tend to form within the heaters.

It is an object of the present invention to provide an improved stock water tank heater which is submerged in the tank.

Another object is to provide an improved gas heater for a stock water tank which will insure a constant supply of fresh air to the gas burner.

Another object is to provide a gas heater, for a stock water tank, having a well and a heat exchanger supported from the well, in which any condensate formed in the heat exchanger enters the well to be re-evaporated and expelled from the heater.

Another object is to provide a gas heater, for stock water tanks, having a well with a gas burner therein and a heat exchanger in which any condensate that might form in the heat exchanger would not tend to extinguish the burner.

A further object of the invention is to provide a gas burning stock water heater having a closed bottom well which will prevent the accumulation of condensate in the bottom thereof.

A still further object is to provide a gas burning stock water heater, including a closed bottom well, which will afford easy access to the burner.

A still further object is to provide a gas burning stock water heater having an immersed well that will remain dry while in operation.

A still further object is to provide a gas burning heater for stock water tanks having an immersed well in which free circulation of air is provided throughout the depth of the well.

Still further objects will become apparent from the following description, which, when taken in conjunction with the accompanying drawings, illustrates a preferred form of the invention.

Figure 1:
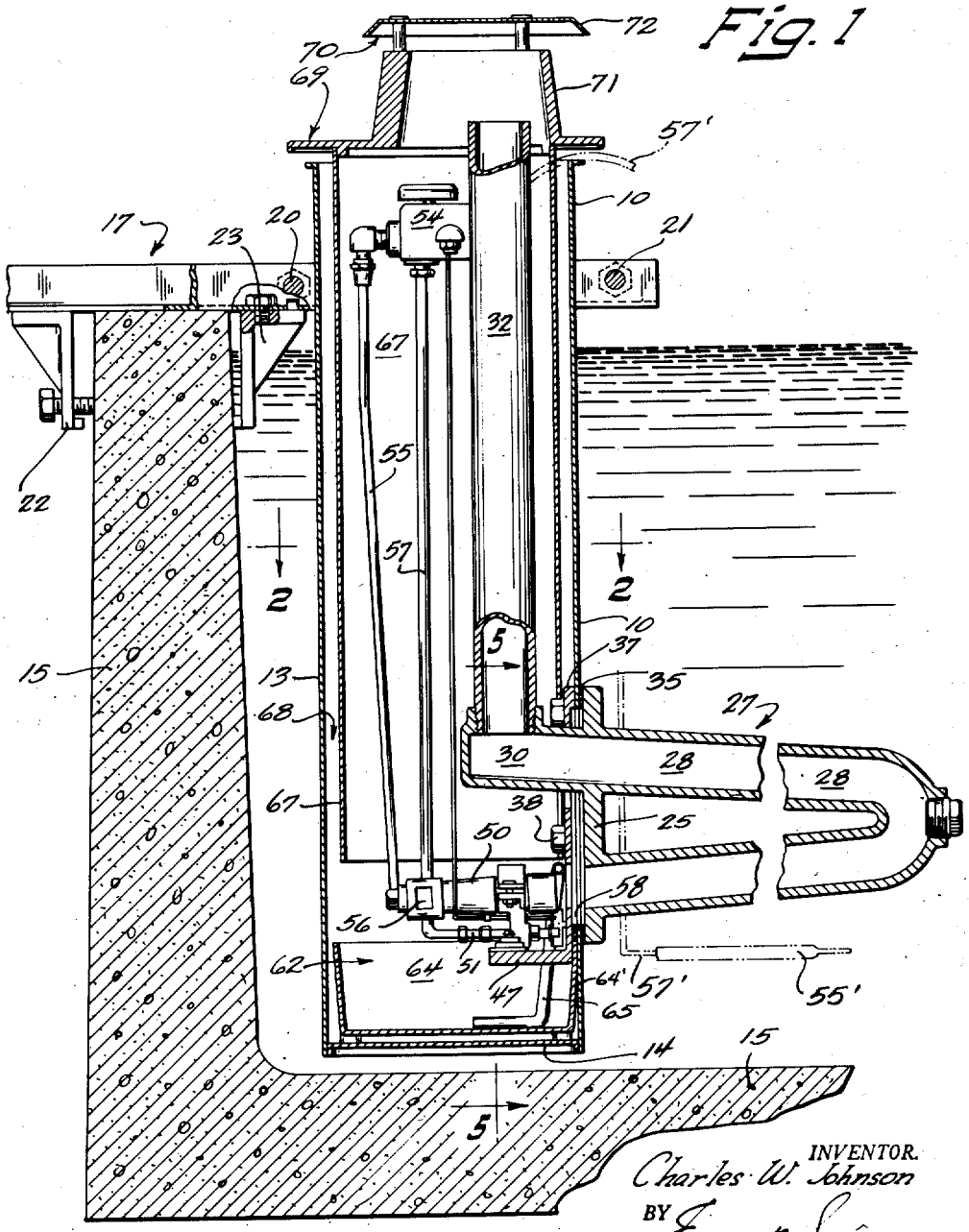
Fig. 1 is a vertical cross-sectional view through a stock water heater embodying the present invention.

Referring to the drawings, the stock water heater may comprise a substantially square well having a front 10, a pair of sides 11—12, a back 13 and a bottom 14. The well is water tight and is immersed in a stock water tank 15 and held in place therein by a supporting clamp 17. The well has a burner chamber at its lower end which houses the burner unit described below. The burner chamber opens into a stack portion which is open at its upper end to the atmosphere.

Figure 3:
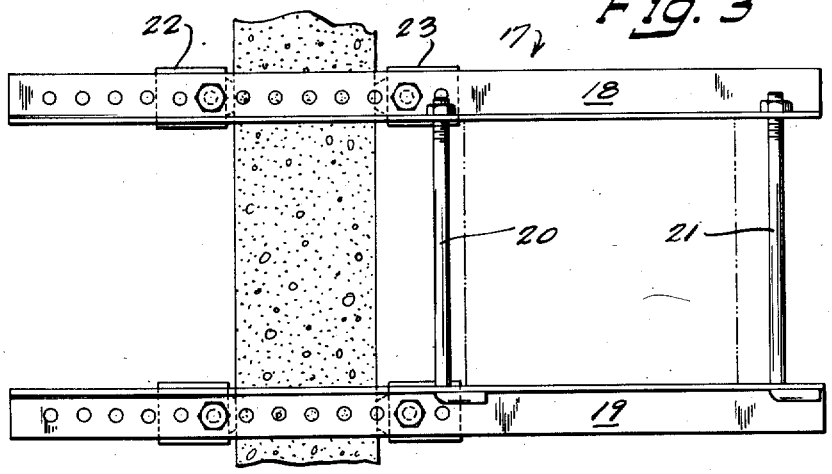
Fig. 3 is a top plan view of the supporting clamps for the stock water heater.

The supporting clamp 17 (Fig. 3) comprises a pair of parallel angle-shaped members 18—19 spaced apart to receive the sides 11—12 of the well, the well being held in place between the angles 18—19 by a pair of bolts 20—21. The angles rest on the top of the tank 15 and are secured thereto between a pair of gripping members 22—23 (Fig. 1).

Referring again to the well, the front 10 has an aperture therethrough, adjacent the lower end thereof, which is covered by a flange 25. The flange 25 carries a heat exchanger 27 which may comprise a constantly upwardly sloping tubular member 28 having an opening through the flange 25 opening into the well at the lower end of the member 28, and an opening through the flange 25 at the upper end of the tubular member 28 which communicates with an extension 30 of the tubular member. The extension 30 terminates in an upwardly facing opening which receives a vent stack 32. The vent stack 32 extends upwardly from the end of the heat exchanger 27 to a point above the top of the well and constitutes an extension of the heat exchanger. As will be seen from the drawings, the heat exchanger 27, the flange 25 and the extension 30 are preferably formed integrally to prevent leaks.

A rubber gasket 35 is interposed between the perimeter of the flange 25 and the front 10 of the well to afford a water proof seal. The flange 25 is secured in place against the front 10 of the well by a flange 37 which is held in place by machine screws 38, the screws 38 drawing the flanges 25 and 37 and the rubber gasket 35 together and securing them on the front wall 10 of the well.

Figure 4:
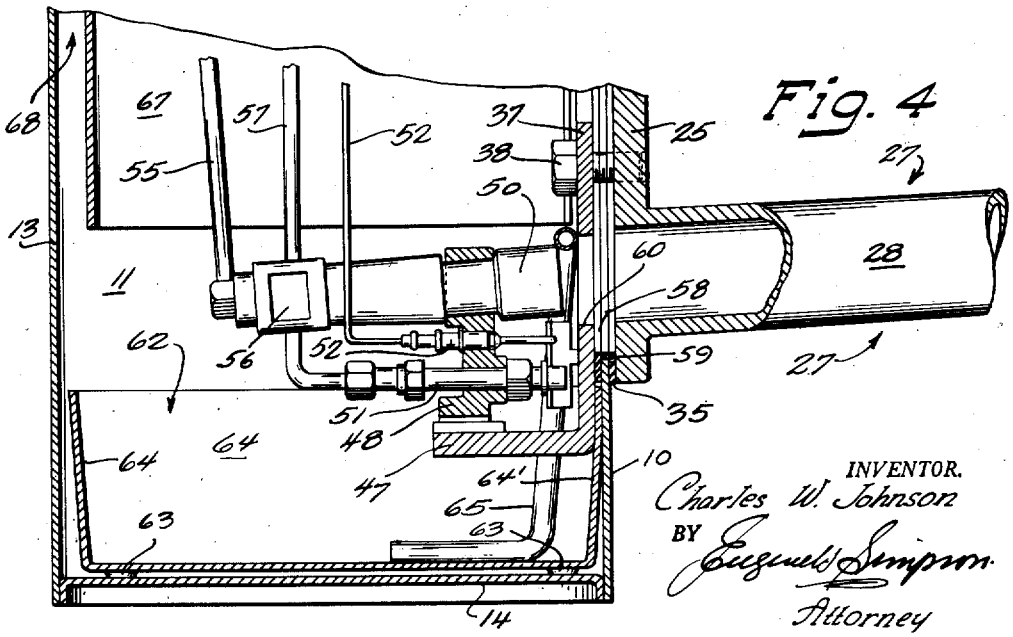
Fig. 4 is an enlarged vertical cross-section similar to Fig. 1 showing the lower portion of the heater well.
Figure 5:
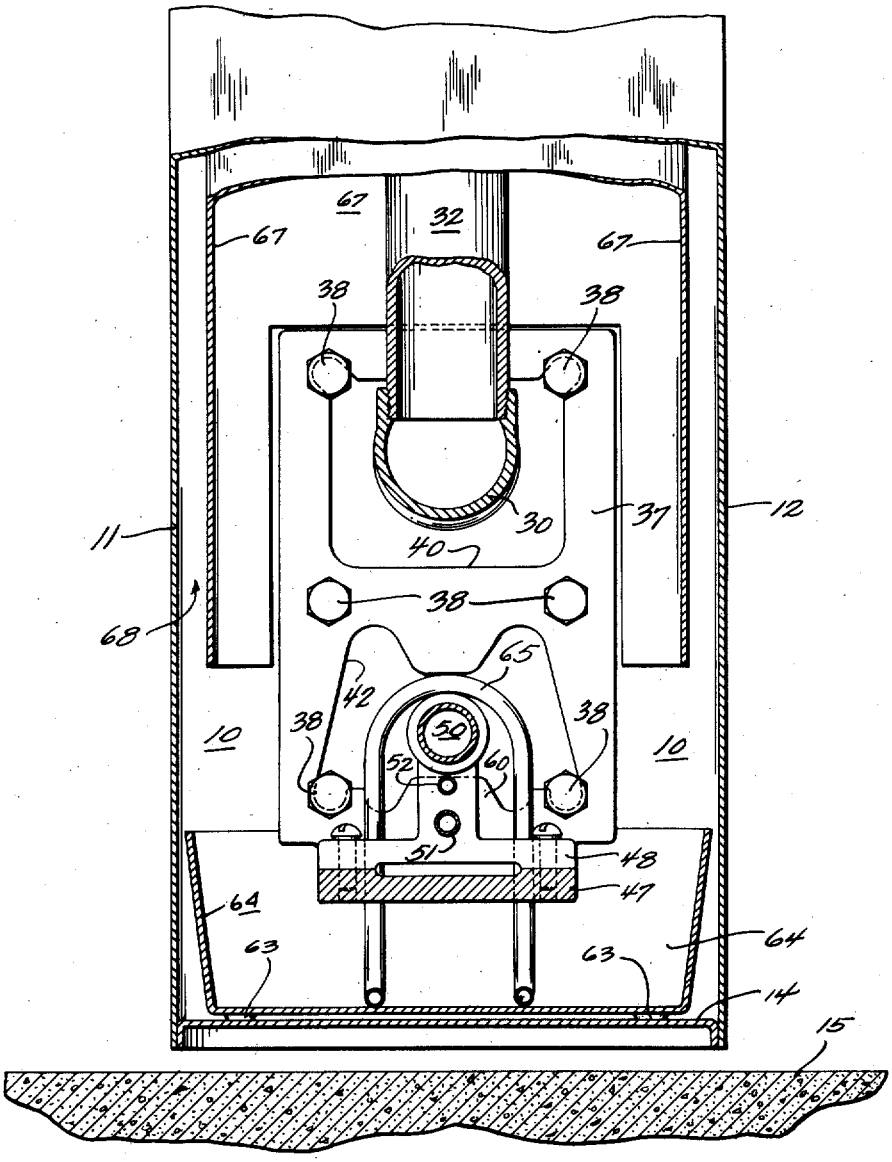
Fig. 5 is a vertical cross-section taken on the line 5—5 of Fig. 1, looking in the direction of the arrows.

The flange 37 has an aperture 40 (Fig. 5) in the upper part thereof through which passes the upper extension 30 of the heat exchanger and a lower opening 42 opposite the lower end of the heat exchanger 27 which permits burning gas to pass into the heat exchanger from a burner 50 (Figs. 1 and 4).

The flange 37 has a bracket 47 which extends horizontally inwardly into the well to support a burner bracket 48. The bracket 48 supports the gas burner 50, a pilot light 51 and a thermocouple 52.

A gas burner 50 is of the Bunsen type, receiving gas from a thermally controlled gas valve 54 through a pipe 55. The gas enters the burner 50 where it is mixed with primary air entering through a pair of alined apertures 56, after which the mixture passes out the end of the burner 50 where it is burned, the burning gas discharging directly into the heat exchanger 27.

The gas burner 50 and the pilot light 51 together constitute a burner unit, each of which supplies heat for the operation of the stock water heater.

The pilot light 51 is of the type shown and described in the co-pending application of Charles W. Johnson, No. 282,125, filed April 14, 1952, and entitled "Pilot Light." The pilot light 51 receives gas through a pipe 57 and burns constantly to maintain the burner 50 lit during the heating periods. At the same time the pilot light heats the thermocouple 52 which controls the entire valve 54 to shut off gas to both the pilot 51 and the main burner 50 in the event the pilot becomes extinguished.

The gas to the main burner 50 is controlled by a thermostat 55' which may be secured by a clip to the heat exchanger or may be located by other supporting means adjacent the heat exchanger. The thermostat 55' is connected to the valve 54 through a tubing 57' so that when the water in the stock tank reaches a predetermined maximum, the valve 54 is actuated by the thermostat to cut off gas to the burner 50 and when the temperature of the water reaches a predetermined minimum the valve 54 turns on the gas to the burner 50. When gas is turned on to the burner it is reignited by the pilot 51.

As the gas in the burner 50 and in the pilot 51 burns, it breaks down into carbon dioxide and water. Some of the water formed by this combustion may condense in the heat exchanger 27 and run back down the heat exchanger 27 to the low end thereof adjacent the burner 50. Should such condensate fall on the heated pilot light 51, steam would be formed which might snuff out the pilot. In order to prevent condensate from the heat exchanger 27 dropping on the pilot 51, a condensate trap 58 is formed at the lower end of the heat exchanger. The gasket 35 has a U-shaped bottom edge which extends over the top of the lower edge of the opening through the front wall 10 and forms a double seal between the flanges 25 and 37 and the opening through the front 10 of the well, the U-shaped bottom edge 59 of the gasket 35 forming the bottom of the trap 58.

The trap 58 has a rear wall formed by an upwardly projecting extension or shield 60 formed on the lower edge of the lower recess 42, which projection or shield 60 is adapted to divert condensate flowing into the trap 58 around the ends of the shield 60 and allows the condensate to drain down into a pan 62 in the bottom of the well.

The pan 62 has feet 63 which maintain the pan off the bottom 14 of the well and has sides 64 which are spaced from the sides 11, 12 and 13 of the well. The side 64' of the pan adjacent the front 10 of the well is held by the lower end of the flange 37 so that all sides except that adjacent the front are spaced from the well to permit free circulation of air about the pan. It will also be noted, that, except at its upper tip the side 64' of the pan 62 adjacent the front 10 of the well, is also spaced from the front wall 10 of the well.

Figure 2:
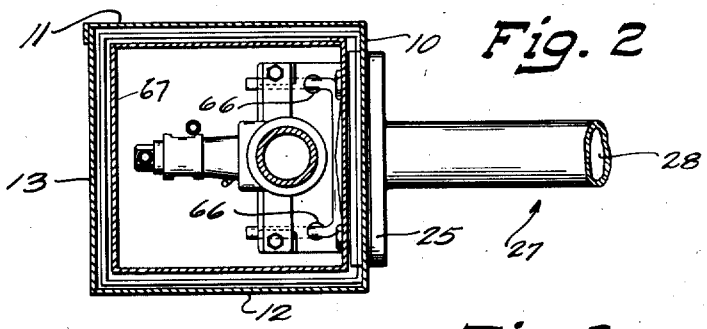
Fig. 2 is a transverse cross-section taken on the line 2—2 of Fig. 1.

The pan 62 is kept warm by a U-shaped rod 65 made of high heat conductivity material, such as copper, which is mounted over the flame from the burner 50 to be heated both by the burner 50 and pilot light 51. The sides of U project downwardly through apertures 66 (Fig. 2) in the bracket 47 to the pan with the tips of the U being bent so as to lie flat on the bottom of the pan. The U-shaped rod thus is used to conduct heat from the burner 50 to the pan 62 to warm any condensate retained therein and aid in its re-evaporation.

The well 10, 11, 12, 13 has a liner 67 mounted therein which is spaced from each of the sides 10, 11, 12 and 13 to provide a free circulation space 68 for air between the sides 10, 11, 12 and 13 of the well and the liner 67. The liner 67 projects above the top of the well and is provided with an open top cap 69 which permits fresh air to enter the space 68 between the sides of the well and the liner 67. *Cap 69 is fitted to the top of liner 67 as shown to prevent any communication of air between the upper entrance to space 68 and the upper inner portion of the liner.*

The liner 67 terminates just above the burner 50 at the lower end of the well so that fresh air passing down the space 68 supplies oxygen for combustion to the gas flame and at the same time the air circulates over the pan 62 causing any liquid in the pan to evaporate.

This evaporation is aided by the heat supplied to the pan by the rod 65.

It will be noted that the width of the liner 67 is slightly less than the width across the pan 62 so that any condensate that might form on the wall of the liner 67 would run back into the pan to be re-evaporated.

The air entering the space 68 after circulating over the pan 62 moves upwardly within the liner and passes out through the open top 70 of the cap 69. The cap 69 has a flue 71 which forms an extension of the *liner* [well] and receives gases from both stack 32 and the interior of the liner 67, so that as the gases leave the well, the gases rising through the liner 67 mingle with the gas leaving the stack 32 before passing out through the common vent 70.

A hood 72 covers the open top 70 of the cap 69 to prevent down drafts.

Operation

In operation, the heater is immersed in the water of a stock water tank and secured therein by the support 17.

The stack 32 may then be removed and the operator's arm inserted in the well to light the pilot light 51. If the water in the tank is below the temperature desired, the valve 54 will operate to supply gas from an L. P. gas tank (not shown) or other source of gas, through the pipe 55 to the burner 50. The gas from the burner is ignited by the flame from the pilot light 51, causing burning gases to flow through the heat exchanger 27 to heat the water in the tank 15.

The burnt gases flow from the heat exchanger 27 upwardly through the stack 32, thus raising the temperature of the stack and pass out through the opening 70 in the cap 69. Since the gases leaving the stack 32 mingle with the gases rising through the liner 67 prior to leaving the well through the common vent 70, it follows that any down draft through the vent 70 acts equally through both the liner 67 and the vent 32 thus precluding the possibility of down drafts extinguishing the flame of the burner 50. The heat from the stack 32 heats the space within the liner 67 causing an updraft through the liner which draws air in from the outside through the space 68.

Air flowing downwardly through the space 68 circulates over the pan 62 causing re-evaporation of any condensate that may have formed and dropped into the pan.

As the gas burner 50 burns, it heats the rod 65, which, being made of a metal having a high coefficient of thermal conductivity (e. g. copper) transmits heat to the bottom of the pan 62 to heat any condensate formed therein thus promoting re-evaporation.

It will be noted that after condensate has been re-evaporated, it passes up through the interior of the liner 67 and is prevented from contacting the cold walls, 10, 11, 12 and 13 which might cause the moisture to again condense.

Should a down draft occur through the open top 70 the air pressure caused by the down draft would be equal on the two ends of the heat exchanger, and thus the flow of hot air would continue to be up through the liner 67 due to the heat from the burner 50.

The hereinbefore described form of the invention is to be taken merely as a preferred embodiment thereof and various changes in size, shape and arrangement of parts may be made without departing from the spirit of the invention or the scope of the subjoined claims.

That which is claimed as new and is desired to be secured by United States Letters Patent is:

1. A stock water heater, or the like, comprising, a well having a closed bottom, a heat exchanger connected with and opening into the lower end of said well and projecting through the side thereof, a Bunsen burner mounted in the lower part of said well and adjacent the opening in said heat exchanger whereby it directs the flame out of said well and into said heat exchanger, a drip pan in the bottom of said well beneath said burner and the open end of said heat exchanger adapted to catch and retain condensate formed within said heat exchanger by burning gas, and means to create a circulation of air over said drip pan to re-evaporate the condensate and to supply air for combustion.

2. A stock water heater, or the like, comprising, a well having a closed bottom, a heat exchanger opening into the lower end of said well through the side thereof, a Bunsen burner mounted in the lower portion of said well and adjacent the opening in said heat exchanger whereby it directs the flame out of said well and into said heat exchanger to supply heat thereto, a drip pan beneath said burner adapted to catch and retain condensate from the products of combustion, means spacing the drip pan from the bottom and sides of the well, and means to create a circulation of fresh air over said drip pan to re-evaporate the condensate and to supply air to support combustion.

3. A stock water heater, or the like, comprising, a well having a closed bottom, a liner in said well spaced from the walls thereof and extending from above the top of the well to a point spaced from the bottom of the well, a heat exchanger fixed to and opening through a side of the lower portion of said well below the lower end of said liner, a gas burner mounted in the lower portion of said well and adapted to discharge products of combustion out of said well and into said heat exchanger to heat the same, a drip pan in the bottom of said well beneath said burner and the open end of said heat exchanger adapted to catch and retain condensate from the products of combustion, and means to create a draft downwardly between the well and the liner to re-evaporate the condensate and to supply air to support combustion.

4. A stock water heater, or the like, comprising, a well having a closed bottom, a liner in said well spaced from the walls thereof and extending from above the top of the well to a point spaced from the bottom of the well, a heat exchanger fixed to an opening into the lower portion of said well below the lower end of said liner, a gas burner mounted in the lower portion of said well and adapted to direct the products of combustion out of said well and into said heat exchanger to heat the same, a drip pan below said burner adapted to catch and retain condensate from the products of combustion, means spacing the drip pan from the bottom and sides of the well, and means to create a draft downwardly between the well and the liner to re-evaporate the condensate and to supply air to support combustion.

5. A stock water heater, or the like, comprising, a well having a closed bottom, a heat exchanger connected with the lower end of said well and opening through the side thereof, a gas burner mounted in the lower part of said well and adjacent the opening in said heat exchanger, whereby it directs heated gas from the well and into said heat exchanger, a drip pan in the bottom of said well beneath said burner and the open end of the heat exchanger adapted to catch and retain the condensate formed within said heat exchanger by burning gas, means including said gas burner to supply heat to the bottom of the pan, and means to create a circulation of air over said drip pan to re-evaporate the condensate and to supply air for combustion.

6. A stock water heater, or the like, comprising, a well having a closed bottom, a heat exchanger opening into the lower end of said well, a gas burner mounted in the lower portion of said well and discharging products of combustion from said well and into said heat exchanger to supply heat thereto, a drip pan beneath said burner adapted to catch and retain condensate from the products of combustion formed within the heat exchanger, means spacing the drip pan from the bottom and sides of the well, means including said gas burner to supply heat to the bottom of the pan, and means to create a circulation of air over said drip pan to re-evaporate the condensate and to supply air to support combustion.

7. A stock water heater, or the like comprising, a well having a closed bottom, a liner in said well spaced from the walls thereof and extending from above the top of the well to a point spaced from the bottom of the well, a heat exchanger fixed to and opening into the lower portion of said well below the bottom of said liner, a gas burner mounted in the lower portion of said well and adapted to direct its products of combustion out of said well and into said heat exchanger to heat the latter, a drip pan beneath said burner adapted to catch and retain condensate from the products of combustion formed within the heat exchanger, means including said gas burner to supply heat to the bottom of the pan, and means, including a portion of said heat exchanger to create a draft downwardly between the well and the liner to re-evaporate the condensate and to supply air to support combustion.

8. A stock water heater, or the like, comprising, a well having a closed bottom, a liner in said well spaced from the walls thereof and extending from above the top of the well to a point spaced from the bottom of the well, a heat exchanger fixed to and opening into the lower portion of said well, a gas burner mounted in the lower portion of said well and adapted to direct its products of combustion out of said well into said heat exchanger to heat the same, a drip pan beneath said burner adapted to catch and retain condensate from the products of combustion, means spacing the drip pan from the bottom and sides of the well, means including said gas burner to supply heat to the bottom of the pan, and means including a portion of said heat exchanger to create a draft downwardly between the well and the liner to re-evaporate the condensate and to supply air to support combustion.

9. A stock water heater, or the like, comprising, a well having a closed bottom, a heat exchanger connected with the lower end of said well and projecting through the side thereof, a Bunsen burner mounted in the lower part of said well and directing heated gas out of said well and into said heat exchanger, a drip pan below said burner adapted to catch and retain condensate formed within the heat exchanger by burning gas, an inverted U-shaped element of high thermal conductivity mounted with the curve of the U overlying the gas burner to be heated thereby, the open ends of said U being bent parallel to the bottom of the drip pan and lying thereon whereby heat from the gas burner is conducted down the sides of the U to the drip pan to heat condensate therein, and means to create a circulation of air over said drip pan to re-evaporate the condensate and to supply air for combustion.

10. A stock water heater, or the like, comprising, a well having a closed bottom, a heat exchanger opening into the lower end of said well, a Bunsen burner mounted in the lower portion of said well and directing its products of combustion out of said well and into said heat exchanger to supply heat thereto, a drip pan below said burner adapted to catch and retain condensate from the heat exchanger, means spacing the drip pan from the bottom and sides of the well, an inverted U-shaped element of high thermal conductivity mounted with the curve of the U overlying the gas burner to be heated thereby, the open ends of said U being bent parallel to the bottom of the drip pan and lying thereon whereby heat from the gas burner is conducted down the sides of the U to the drip pan to heat condensate therein, and means to create a circulation of air over said drip pan to re-evaporate the condensate and to supply air to support combustion.

11. A stock water heater, or the like, comprising, a well having a closed bottom, a liner in said well spaced from the walls thereof and extending from above the top of the well to a point spaced from the bottom of the well, a heat exchanger fixed to and opening into the lower portion of said well below the lower end of said liner, a gas burner mounted in the lower portion of said well and adapted to discharge products of combustion into said heat exchanger to heat the same, a drip pan beneath said burner adapted to catch and retain condensate from the products of combustion within said heat exchanger, an inverted U-shaped element of high thermal conductivity mounted with the curve of the U overlying the gas burner to be heated thereby, the open ends of said U being bent parallel to the bottom of the drip pan and lying thereon whereby heat from the gas burner is conducted down the sides of the U to the drip pan to heat condensate therein, and means to create a draft downwardly between the well and the liner to reevaporate the condensate and to supply air to support combustion.

12. A stock water heater, or the like, comprising, a well having a closed bottom, a liner in said well spaced from the walls thereof and extending from above the top of the well to a point spaced from the bottom of the well, a heat exchanger fixed to and opening into the lower portion of said well below the lower end of said liner, a gas burner mounted in the lower portion of said well and adapted to discharge products of combustion into said heat exchanger to heat the same, a drip pan beneath said burner adapted to catch and retain condensate from said heat exchanger, means spacing the drip pan from the bottom and sides of the well, an inverted U-shaped element of high thermal conductivity mounted with the curve of the U overlying the gas burner to be heated thereby, the open ends of said U being bent parallel to the bottom of the drip pan and lying thereon whereby heat from the gas burner is conducted down the sides of the U to the drip pan to heat condensate therein, and means to create a draft downwardly between the well and the liner to re-evaporate the condensate and to supply air to support combustion.

13. A water heater adapted to be immersed in the water of a stock watering tank, or the like, comprising, a well having a closed bottom, said well being adapted to be immersed in the water in said tank, an open end liner within the well spaced from the walls thereof and extending above the top of the well to form an entrance for air between the well and the liner and terminating above the bottom of the well, an upwardly sloping heat exchanger fixed on the exterior of said well, said heat exchanger having its lower end communicating with the interior of said well, the upper end of said heat exchanger projecting through said well and into said liner at a point above the opposite end of said heat exchanger, a vent flue fixed to the upper end of the heat exchanger and extending upwardly through said liner to a point adjacent the open top of the liner, and a gas burner adapted to discharge the products of combustion through said heat exchanger to heat both the heat exchanger and the vent flue whereby a circulation of air is created through the well drawing in air through the passage between the well and the liner and discharging it through the open top of the liner to re-evaporate condensate from the bottom of the well and to supply air for combustion.

14. A water heater adapted to be immersed in the water of a stock watering tank, or the like, comprising, a well having a closed bottom, said well being adapted to be immersed in the water in said tank, an open end liner within the well spaced from the walls thereof and extending above the top of the well to form an entrance for air between the well and the liner and terminating above the bottom of the well, a drip pan seated on said closed bottom and spaced therefrom, an upwardly sloping heat exchanger fixed on the exterior of said well, said heat exchanger having its lower end communicating with the interior of said well, the upper end of said heat exchanger projecting through said well and into said liner at a point above the opposite end of said heat exchanger, a vent flue fixed to the upper end of the heat exchanger and extending upwardly through said liner to a point adjacent the open top of the liner, and a gas burner adapted to discharge the products of combustion through said heat exchanger to heat both the heat exchanger and the vent flue whereby a circulation of air is created through the well drawing in air through the passage between the well and the liner and discharging it through the open top of the liner to re-evaporate condensate from the drip pan and to supply air for combustion.

15. A water heater adapted to be immersed in the water of a stock watering tank, or the like, comprising, a well having a closed bottom, said well being adapted to be immersed in the water in said tank, an open end liner within the well spaced from the walls thereof and extending above the top of the well to form an entrance for air between the well and the liner and terminating above the bottom of the well, a drip pan seated on said closed bottom and spaced therefrom, an upwardly sloping heat exchanger fixed on the exterior of said well, said heat exchanger having its lower end communicating with the interior of said well, the upper end of said heat exchanger projecting through said well and into said liner at a point above the opposite end of said heat exchanger, a vent flue fixed to the upper end of the heat exchanger and extending upwardly through said liner to a point adjacent the open top of the liner, a gas burner adapted to discharge the products of combustion through said heat exchanger to heat both the heat exchanger and the vent flue, means to conduct heat from the burner to the drip pan whereby condensate in the pan is warmed and a circulation of air is created through the well drawing in air through the passage between the well and the liner and discharging it through the open top of the liner to re-evaporate condensate from the drip pan and to supply air for combustion.

16. A gas water heater adapted to be immersed in the water of a stock watering tank, or the like, comprising, a well having a closed bottom, a drip pan mounted on said closed bottom and insulated therefrom, a constantly upwardly sloping heat exchanger fixed to the exterior of said well and opening thereinto at its lower end, a gas burner mounted above said drip pan and discharging products of combustion into said heat exchanger, a pilot light adapted to relight the gas burner, a condensate trap adjacent the entrance of the heat exchanger, and a shield forming the front wall of the trap, said shield diverting condensate within the heat exchanger into said pan without the condensate contacting the pilot light.

17. In a stock water heater, or the like, a well having a closed bottom, a heat exchanger opening into said well at a point adjacent the bottom thereof, said heat exchanger extending upwardly exteriorly of the well and re-entering the well through an opening spaced vertically above the first named opening, a gas burner unit mounted in the lower end of the well and projecting a flame into said heat exchanger whereby the burning gases enter the lower end of the heat exchanger through the lower opening, pass upwardly through the heat exchanger and re-enter the well through the second named opening, a liner spaced from the sides of the well and extending from a point above the top of the well to a point spaced vertically above the closed bottom of the well, whereby cold air may pass downwardly between the well and the liner to support combustion, and hot gases from the burner pass upwardly through said liner to mingle with the hot gases expelled through the second named opening, and a common vent for hot gases from both said heat exchanger and said liner.

18. In a stock water heater, or the like, a well having a closed bottom, a heat exchanger opening into said well at a point adjacent the bottom thereof, said heat exchanger extending upwardly exteriorly of the well and re-entering the well through an opening spaced vertically above the first named opening, a gas burner unit mounted in the lower end of the well and projecting a flame into said heat exchanger whereby the burning gases enter the lower end of the heat exchanger through the lower opening, pass upwardly through the heat exchanger and re-enter the well through the second named opening, a liner spaced from the sides of the well and extending from a point above the top of the well to a point spaced vertically above the closed bottom thereof, means to conduct the exhaust from the heat exchanger into the interior of said liner, whereby cold air may pass downwardly between the well and the liner to support combustion and hot gases from the burner pass upwardly through said liner to co-mingle with the hot gases expelled from said heat exchanger, and a common vent for the hot gases from both said heat exchanger and said liner.

19. In a stock water heater, or the like, a well having a closed bottom, a heat exchanger opening into said well at a point adjacent the bottom thereof, said heat exchanger extending upwardly exteriorly of the well and re-entering the well through an opening spaced vertically above the first named opening, a gas burner unit mounted in the lower end of the well and projecting a flame into said heat exchanger whereby the burning gases enter the lower end of the heat exchanger through the lower opening, pass upwardly through the heat exchanger and re-enter the well through the second named opening, a drip pan in the lower part of said well spaced from the bottom and sides thereof adapted to receive condensate from burning gases, a liner spaced from the sides of the well and extending from a point above the top of the well to a point spaced vertically above the closed bottom thereof, means to conduct the exhaust from the heat exchanger into the interior of said liner, whereby cold air may pass downwardly between the well and the liner both to support combustion and to re-evaporate the condensate in the drip pan and whereby hot gases from the burner pass upwardly through said liner to co-mingle with the hot gases expelled from said heat exchanger, and a common vent for the hot gases from both said heat exchanger and said liner.

20. In a stock water heater, or the like, a well having a closed bottom, a heat exchanger opening into said well at a point adjacent the bottom there of, said heat exchanger extending upwardly exteriorly of the well and re-entering the well through an opening spaced vertically above the first named opening, a gas burner unit mounted in the lower end of the well and projecting a flame into said heat exchanger whereby the burning gases enter the lower end of the heat exchanger through the lower opening, pass upwardly through the heat exchanger and re-enter the well through the second named opening, a drip pan in the lower part of said well spaced from the bottom and sides thereof adapted to receive condensate from burning gases, a liner spaced from the sides of the well and extending from a point above the top of the well to a point spaced vertically above the closed bottom of the well, whereby cold air may pass downwardly between the well and the liner both to support combustion and to re-evaporate the condensate in the drip pan, and whereby hot gases from the burner pass upwardly through said liner to mingle with the hot gases expelled through the second named opening, and a common vent for hot gases from both said heat exchanger and said liner.

21. An immersion type heater for liquids comprising, a burner chamber open at its upper end, a torch type burner unit in said changer and arranged substantially centrally and horizontally therein to discharge toward an opposite wall, a laterally extending inclined generally horizontal tubular heat exchanger having its open lower end secured in said opposite wall of the chamber in a position to directly receive heat and the products of combustion from said burner, and having its upper end passing through a wall portion of said chamber and terminating directly above said burner, an upright stack in communication with the upper end of said chamber and having its upper end in communication with the atmosphere, and a tubular flue within said stack and spaced from the interior wall thereof, said flue having its lower end in direct communication with, rigidly secured to and supported by the upper end of said heat exchanger, and having its open upper end terminating at a level slightly above the upper end of said stack.

22. All of the elements in claim 21 and in addition, in which the minimum free flow area through which air may pass to said burner chamber around said flue and the extension supporting end of the heat exchanger is at least as great as the minimum free flow area through said laterally extending heat exchanger and its flue.

23. All of the elements in claim 21 and in addition, in which the internal dimensions of the burner chamber and its stack are so related to the internal and external dimensions of the flue and the chamber enclosed end of said heat exchanger that the resistance to air flow to said burner chamber through the space surrounding said heat exchanger and its flue is no greater than the resistance to air flow through said heat exchanger and its flue.

24. A stock water heater, or the like, comprising a well having a closed bottom, a heat exchanger connected with and opening into the lower end of said well and projecting through the side thereof, a Bunsen burner mounted in the lower part of said well and adjacent the opening in said heat exchanger whereby it directs the flame out of said well and into said heat exchanger, means *spaced from* [at] the bottom *and sides* of said well beneath said burner and the open end of said heat exchanger adapted to catch and retain condensate formed within said heat exchanger by burning gas, and means to create a circulation of air over said condensate catching means to re-evaporate the condensate and to supply air for combustion.

*25. A water heater adapted to be immersed in the water of a stock watering tank, or the like, comprising, a well having a closed bottom, said well being adapted to be immersed in the water in said tank, an open end liner within the well spaced from the walls thereof and extending above the top of the well to form an entrance for air between the well and the liner and terminating above the bottom of the well, means closing communication between said entrance for air and the upper inner portion of said liner, an upwardly sloping heat exchanger fixed on the exterior of said well, said heat exchanger having its lower end communicating with the interior of said well, a gas burner unit mounted in the lower end of the well and projecting a flame into said heat exchanger, a flue on the top of said liner forming an extension thereof, and a vent stack fixed at one end to the upper end of said heat exchanger and communicating at its other end with said flue in substantially the same place as said liner so that gases passing upwardly from said stack and said liner are co-mingled prior to passing out of said flue.*

*26. A water heater adapted to be immersed in the water of a stock watering tank, or the like, comprising, a well having a closed bottom, said well being adapted to be immersed in the water in said tank, an open end liner within the well spaced from the walls thereof and extending above the top of the well to form an entrance for air between the well and the liner and terminating above the bottom of the well, means closing communication between said entrance for air and the upper inner portion of said liner, an upwardly sloping heat exchanger fixed on the exterior of said well, said heat exchanger having its lower end communicating with the interior of said well, a gas burner unit mounted in the lower end of the well and projecting a flame into said heat exchanger, a discharge stack on said heat exchanger, and vent means communicating at one end with the atmosphere and at the other end with the upper end of said liner and the discharge end of said stack whereby the gases from said liner and said stack are co-mingled before passing into the atmosphere.*

*27. A water heater adapted to be immersed in the water of a stock watering tank, or the like, comprising, a well having a closed bottom, said well being adapted to be immersed in the water in said tank, an open end liner within the well spaced from the walls thereof and extending above the top of the well to form an entrance for air between the well and the liner and terminating above the bottom of the well, means closing communication between said entrance for air and the upper inner portion of said liner, an upwardly sloping heat exchanger fixed on the exterior of said well, said heat exchanger having its lower end communicating with the interior of said well, a gas burner unit mounted in the lower end of the well and projecting a flame into said heat exchanger, and means for co-mingling the hot gases from said heat exchanger and said liner prior to passing into the atmosphere; said means comprising, a flue communicating at one end with the atmosphere and at the other end with the upper end of said liner, and means directing gases from said heat exchanger into said other end of said flue in substantially the same plane of flow as gases from said liner.*

*28. A water heater adapted to be immersed in the water of a stock watering tank, or the like, comprising, a well having a closed bottom, said well being adapted to be immersed in the water in said tank, an open end liner within the well spaced from the walls thereof, means forming an entrance for air between the liner and well at the upper portion thereof, means closing communicating between said entrance for air and the upper inner portion of said liner, an upwardly sloping heat exchanger fixed on the exterior of said well, said heat exchanger having its lower end communicating with the interior of said well, a gas burner unit mounted in the lower end of the well and projecting a flame into said heat exchanger, and means for co-mingling the hot gases from said heat exchanger and said liner prior to passing into the atmosphere; said means comprising, a flue communicating at one end with the atmosphere and at the other end with the upper end of said liner, and means directing gases from said heat exchanger into said other end of said flue in substantially the same plane of flow as gases from said liner.*

*29. A water heater adapted to be immersed in the water of a stock watering tank, or the like, comprising, a well having a closed bottom, said well being adapted to be immersed in the water in said tank, an open end liner within the well spaced from the walls thereof and extending above the top of the well to form an entrance for air between the well and the liner and terminating above the bottom of the well, means closing communication between said entrance for air and the upper inner portion of the said liner, an upwardly sloping heat exchanger fixed on the exterior of said well, said heat exchanger having its lower end communicating with the interior of said well, a gas burner unit mounted in the lower end of the well and projecting a flame into said heat exchanger, a discharge stack on said heat exchanger, vent means communicating at one end with the atmosphere and at the opposite end thereof with the upper end of said liner and the discharge end of said stack in such a position relative to each other that pressures therein remain neutral in the event of a down draft through said vent means.*

References Cited in the file of this patent or the original patent

UNITED STATES PATENTS

| | | |
|---|---|---|
| 436,575 | Conger | Sept. 16, 1890 |
| 845,636 | Harris | Feb. 26, 1907 |
| 940,445 | Elder | Nov. 16, 1909 |
| 1,001,232 | Townsend | Aug. 22, 1911 |
| 1,166,411 | Davis | Dec. 28, 1915 |
| 1,468,561 | Friend | Sept. 18, 1923 |
| 1,983,294 | Huttenmiller | Dec. 4, 1934 |
| 2,035,260 | Chadwick et al. | Mar. 24, 1936 |
| 2,185,594 | Kittel | Jan. 2, 1940 |
| 2,268,789 | Watt | Jan. 6, 1942 |
| 2,617,407 | Johnson | Nov. 11, 1952 |

FOREIGN PATENTS

| | | |
|---|---|---|
| 8,080 | Great Britain | Apr. 23, 1895 |